US011714656B2

(12) United States Patent
Takanashi

(10) Patent No.: US 11,714,656 B2
(45) Date of Patent: Aug. 1, 2023

(54) MEMORY SYSTEM EXECUTING LOADING OF SOFTWARE AT STARTUP AND CONTROL METHOD

(71) Applicant: Kioxia Corporation, Tokyo (JP)

(72) Inventor: Yoshihiro Takanashi, Kamakura (JP)

(73) Assignee: Kioxia Corporation, Tokyo (JP)

( * ) Notice: Subject to any disclaimer, the term of this patent is extended or adjusted under 35 U.S.C. 154(b) by 400 days.

(21) Appl. No.: 17/014,807

(22) Filed: Sep. 8, 2020

(65) Prior Publication Data

US 2021/0279068 A1 Sep. 9, 2021

(30) Foreign Application Priority Data

Mar. 6, 2020 (JP) ................................ 2020-038803

(51) Int. Cl.

| | |
|---|---|
| ***G06F 9/00*** | (2006.01) |
| ***G06F 9/4401*** | (2018.01) |
| ***G06F 9/445*** | (2018.01) |
| ***G06F 12/10*** | (2016.01) |
| ***G06F 11/10*** | (2006.01) |
| ***G06F 12/02*** | (2006.01) |

(52) U.S. Cl.

CPC ........ *G06F 9/4406* (2013.01); *G06F 9/44505* (2013.01); *G06F 11/1068* (2013.01); *G06F 12/0253* (2013.01); *G06F 12/10* (2013.01); *G06F 2212/1044* (2013.01); *G06F 2212/657* (2013.01)

(58) Field of Classification Search

CPC .......... G06F 9/4401; G06F 9/44; G06F 12/10; G06F 12/02; G06F 11/10

See application file for complete search history.

(56) References Cited

U.S. PATENT DOCUMENTS

| | | | | |
|---|---|---|---|---|
| 6,907,602 | B2 * | 6/2005 | Tsai | G06F 8/65 717/168 |
| 9,582,431 | B2 | 2/2017 | Cohen | |
| 9,880,755 | B2 | 1/2018 | Dewitt et al. | |
| 10,007,508 | B2 | 6/2018 | Sugino et al. | |
| 11,042,310 | B2 * | 6/2021 | Suzuki | G06F 3/0616 |
| 2009/0138650 | A1 * | 5/2009 | Lin | G06F 8/65 711/E12.008 |
| 2014/0344797 | A1 * | 11/2014 | Rajagopalan | G06F 8/61 717/169 |

FOREIGN PATENT DOCUMENTS

| | | |
|---|---|---|
| JP | 6218869 B2 | 10/2017 |
| JP | 6265746 B2 | 1/2018 |

* cited by examiner

*Primary Examiner* — Tammara R Peyton

(74) *Attorney, Agent, or Firm* — Oblon, McClelland, Maier & Neustadt, L.L.P.

(57) ABSTRACT

According to one embodiment, a memory system includes a nonvolatile memory, and a controller. The controller controls the nonvolatile memory. The nonvolatile memory includes a first area where specific software is capable of being stored, and a second area where the specific software is stored. The second area has higher reliability than the first area. The controller causes the specific software to be stored in the first area when receiving a command specifying the specific software, and executes loading of the specific software stored in the first area at startup of the controller.

20 Claims, 6 Drawing Sheets

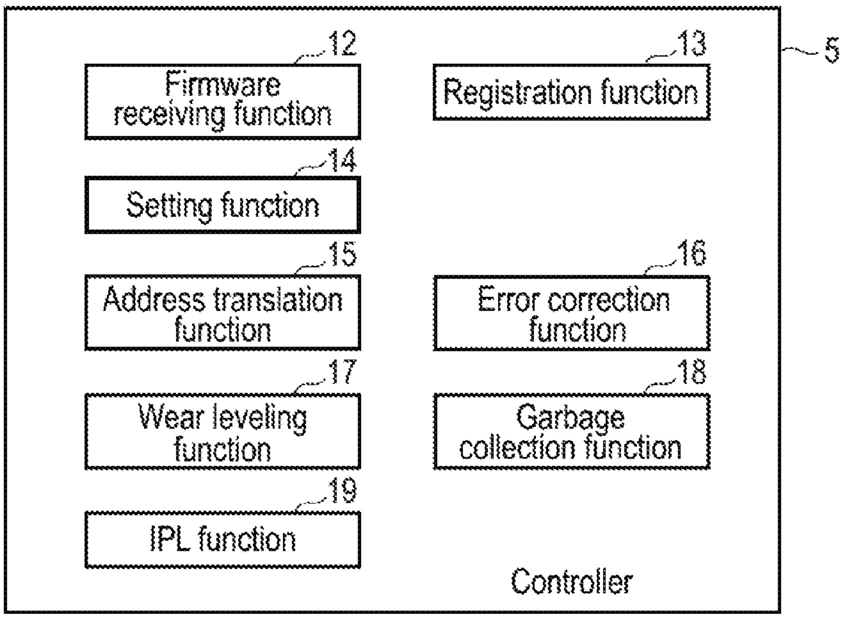
F I G. 3

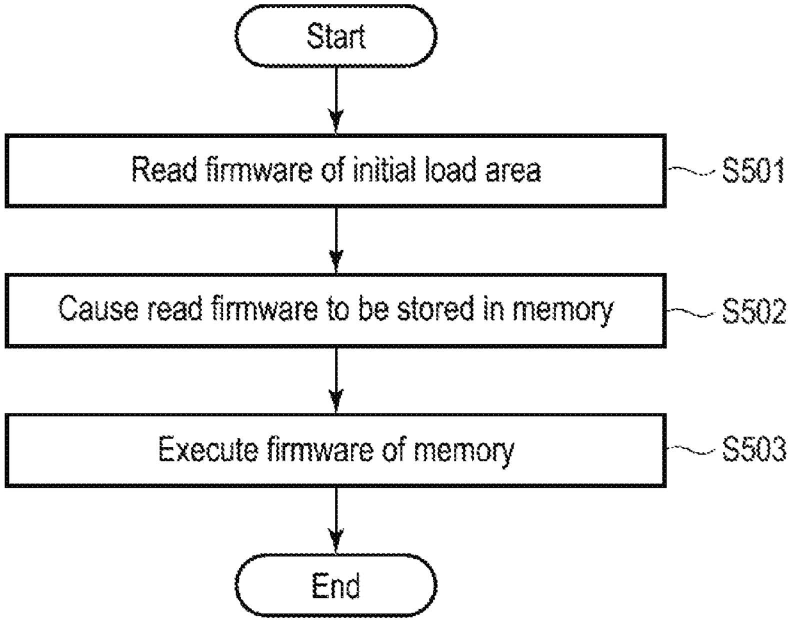
F I G. 5

MEMORY SYSTEM EXECUTING LOADING OF SOFTWARE AT STARTUP AND CONTROL METHOD

CROSS-REFERENCE TO RELATED APPLICATIONS

This application is based upon and claims the benefit of priority from Japanese Patent Application No. 2020-038803, filed Mar. 6, 2020, the entire contents of which are incorporated herein by reference.

FIELD

Embodiments described herein relate generally to a memory system executing loading of software at startup and a control method.

BACKGROUND

A nonvolatile memory of a memory system includes an area (memory area) where software (more specifically, firmware image) loaded at startup of the memory system is stored and an area where user data is stored.

BRIEF DESCRIPTION OF THE DRAWINGS

FIG. 3 is a block diagram illustrating a concrete example of a functional configuration of the controller according to the embodiment.

FIG. 5 is a flowchart illustrating an example of a process at startup in the memory system according to the embodiment.

DETAILED DESCRIPTION

An embodiment will be described hereinafter with reference to the accompanying drawings. In the following description, constituent elements having substantially the same function and configuration will be denoted by the same reference number, and description will be repeated only when necessary. Further, the following embodiment illustrates a device and a method which give concrete forms to technical ideas, and the technical ideas of the embodiment are not intended to limit materials, shapes, structures, arrangements, etc., of components to those descried below. The technical ideas of the embodiment can be modified in various manners in the scope of patent claims.

In general, according to one embodiment, a memory system includes a nonvolatile memory, and a controller. The controller controls the nonvolatile memory. The nonvolatile memory includes a first area where specific software is capable of being stored, and a second area where the specific software is stored. The second area has higher reliability than the first area. The controller causes the specific software to be stored in the first area when receiving a command specifying the specific software, and executes loading of the specific software stored in the first area at startup of the controller.

In the embodiment, an example in which the memory system conforms to the Non-Volatile Memory express (NVMe) standard will be illustrated. However, even when the memory system does not conform to the NVMe standard, the memory system can obtain the same operation and advantages by the same configuration. Even when the memory system conforms to the standard different from the NVMe standard, the memory system can obtain the same operation and the same advantages by the same configuration.

In the embodiment, an example in which the controller executes loading of the firmware at the startup (for example, boot) of the memory system will be illustrated. In other words, in the embodiment, an example in which the controller executes loading of the firmware at the startup of the controller included in the memory system, will be illustrated. However, even when the controller executes loading of software other than the firmware at the startup of the memory system, the controller can obtain the same operation and the same advantages by the same configuration.

Figure 1:
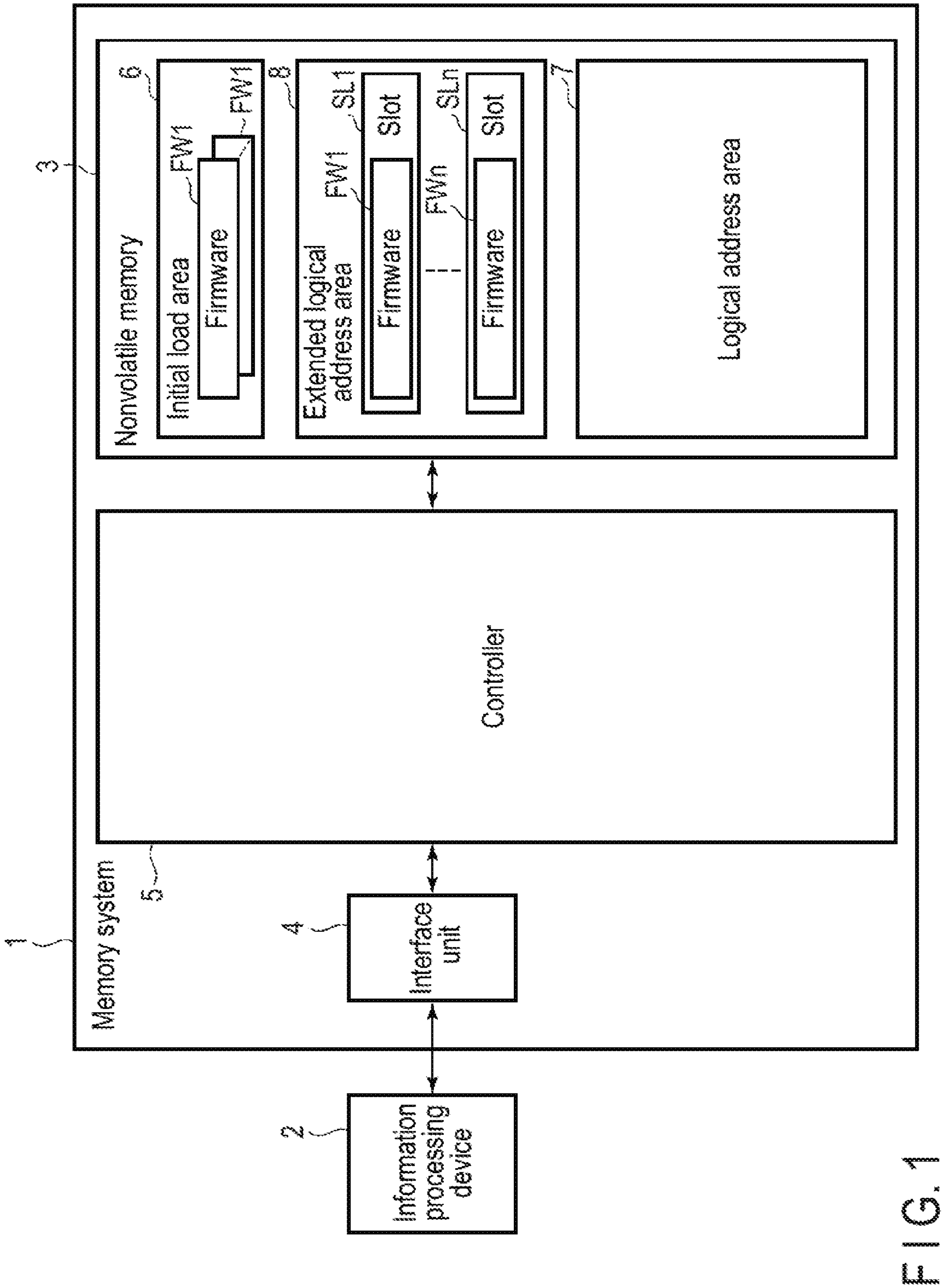
FIG. 1 is a block diagram illustrating an example of a configuration of a memory system according to an embodiment.

FIG. 1 is a block diagram illustrating an example of a configuration of a memory system 1 according to the embodiment. FIG. 1 illustrates a case where firmware FW1 is active.

The memory system 1 is, for example, a solid state drive (SSD). The memory system 1 may be one of various types of storage devices such as a hard disk drive (HDD), a universal serial bus (USB), a memory card, a hybrid storage system including an HDD and an SSD, and an optical disk device. The memory system 1 is connected to an external information processing device 2 so as to be communicable with the information processing device 2.

The memory system 1 includes a nonvolatile memory 3, an interface unit 4, and a controller 5.

The nonvolatile memory 3 is, for example, a NAND flash memory. The nonvolatile memory 3 may be the other nonvolatile memory such as an NOR flash memory, a magnetoresistive random access memory (MRAM), a phasechange random access memory (PRAM), a resistive random access memory (ReRAM), or a ferroelectric random access memory (FeRAM). The nonvolatile memory 3 includes a plurality of memory chips. For example, the nonvolatile memory 3 may be a magnetic memory, a semiconductor memory having a three-dimensional structure, or the like. Reading data from or storing data to the nonvolatile memory 3 can be executed in a unit referred to as a page. Erasing data in the nonvolatile memory 3 can be executed in a unit referred to as a block. One unit of the block includes a plurality of pages. Reading data from or storing data to the nonvolatile memory 3 may be executed in a unit which includes a plurality of pages. Erasing data in the nonvolatile memory 3 may be executed in a unit which includes a plurality of blocks.

The interface unit 4 receives various commands and sends the received commands to the controller 5. When receiving the firmware, the interface unit 4 sends the received firmware to the controller 5. The interface unit 4 may be a part of the controller 5.

When receiving a command from the information processing device 2 via the interface unit 4, the controller 5 executes control of the nonvolatile memory 3, based on the received command.

The nonvolatile memory 3 includes an initial load area 6, a logical address area 7, and an extended logical address area 8. In the embodiment, the logical address area 7 and the extended logical address area 8 have higher reliability than the initial load area 6. In the embodiment, a feature that an area for storing data has higher reliability may indicate at least one of features that the probability of occurrence of an error in the data is low or that the number of correctable error bits of the data is large. Alternatively, the feature that the area for storing the data has higher reliability may indicate that memory cells have higher endurance. This indicates that as the reliability of the area is higher the performance of this area for protecting the data is higher. The logical address area 7 and the extended logical address area 8 store, for example, error correction code (ECC)-allocated data. The logical address area 7 and the extended logical address area 8 may be areas where the controller 5 cannot access at the startup of the memory system 1.

The initial load area 6 is an area which can be accessed at the startup of the memory system 1. In the initial load area 6, specific firmware to be loaded at the startup of the memory system 1 can be stored. The initial load area 6 is used as an active slot. The active slot is a slot where the firmware loaded at the startup of the memory system 1 can be stored. The initial load area 6 is arranged at a predetermined location (for example, a fixed block) in the nonvolatile memory 3. The initial load area 6 may has lower reliability than the logical address area 7 and the extended logical address area 8. It is assumed that, for example, the initial load area 6 is not a target of wear leveling and garbage collection executed by the controller 5. In the initial load area 6, firmware FW1 in a multiplex state can be stored. The multiplexing refers to, for example, a scheme of storing a plural number of the same firmware. When several firmware of a plural number of firmware are unreadable but the other firmware are readable, the controller 5 can acquire normal firmware, by employing the multiplexing. In addition, when parts of several firmware of a plural number of firmware are unreadable but the other firmware are readable, the controller 5 can repair the unreadable parts based on the other readable parts of the plural number of firmware, and acquire normal firmware, by employing the multiplexing.

The logical address area 7 is, for example, a user data area where user data are stored. Data can be read from the logical address area 7 in accordance with a user's instruction.

The extended logical address area 8 is, for example, an area having a higher reliability than the initial load area 6. For example, the extended logical address area 8 has reliability on the same level as the logical address area 7. The extended logical address area 8 may be an area to which an access is allowed under control of a system such as the controller 5. The extended logical address area 8 may be referred to as, for example, a system area. Data cannot be read from the system area in accordance with a user's instruction. The extended logical address area 8 includes a plurality of slots SL1 to SLn. Each of the plurality of slots SL1 to SLn stores each of a plurality of firmware FW1 to FWn that can be stored in the initial load area 6. Each of the plurality of firmware FW1 to FWn stored in the respective slots SL1 to SLn is candidate of firmware which is to be loaded at the startup of the memory system 1. One of the plurality of firmware FW1 to FWn is selected as the active firmware which is to be the load target at the startup of the memory system 1.

In the embodiment, it is assumed that the plurality of firmware FW1 to FWn stored in the extended logical address area 8 are not multiplexed. However, the smaller number of firmware FW1 to FWn stored in the extended logical address area 3 than the firmware FW1 stored in the initial load area 6 may be multiplexed.

The controller 5 translates a logical address to a physical address, based on address translation data, and accesses a physical location in the logical address area 7 or extended logical address area 8 corresponding to the physical address.

In the embodiment, the logical address may be a logical block address (LBA). The physical address corresponding to the logical address may be a physical block address (PBA). In this case, the controller 5 translates LBA into PBA corresponding to the LBA, based on the address translation data. Net, the controller 5 can read data stored at the location indicated by the PBA or store data to the location indicated by the PBA.

Figure 2:
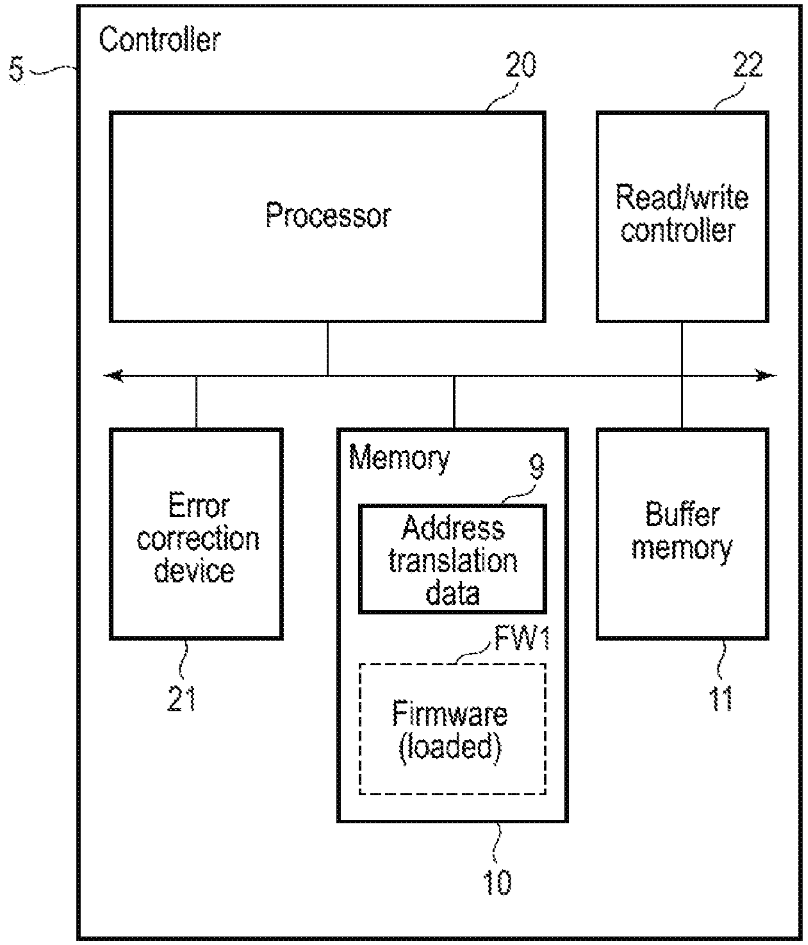
FIG. 2 is a block diagram illustrating a concrete example of a hardware configuration of a controller according to the embodiment.

Next, a hardware configuration of the controller 5 will be described. FIG. 2 is a block diagram illustrating a concrete example of the hardware configuration of the controller 5 according to the embodiment.

The controller 5 includes a memory 10, a processor 20, an error correction device 21, a buffer memory 11, and a read/write controller 22. Incidentally, the memory 10 and the buffer memory 11 may be configured separately from the controller 5.

The memory 10 is, for example, a dynamic random access memory (DRAM), a static random access memory (SRAM) or the like. For example, the memory 10 is used as a main memory. The memory 10 stores, for example, address translation data 9. For example, the address translation data 9 is read from the nonvolatile memory 3 and stored in the memory 10, by the controller 5.

For example, the processor 20 executes the firmware FW1 stored in the memory 10 after the startup of the memory system 1 and controls the error correction device 21, the memory 10, the buffer memory 11, the read/write controller 22, and the like.

The error correction device 21 adds ECC to user data received via the interface unit 4. In addition, the error correction device 21 executes error correction of data which is read from the nonvolatile memory 3 via the read/write controller 22.

The buffer memory 11 is, for example, a latch circuit, a register, DRAM, SRAM, or the like. For example, the buffer memory 11 is used to exchange data between a plurality of constituent elements of the controller 5. The buffer memory 11 temporarily stores data stored in the nonvolatile memory 3. In addition, the buffer memory 11 temporarily stores data read from the nonvolatile memory 3. More specifically, the buffer memory 11 stores, for example, data read from the nonvolatile memory 3 by the read/write controller 22. In addition, the buffer memory 11 stores, for example, data which the read/write controller 22 causes the nonvolatile memory 3 to store.

The read/write controller 22 controls reading data from the nonvolatile memory 3. In addition, the read/write controller 22 controls storing data in the nonvolatile memory 3. Furthermore, the read/write controller 22 controls erasing data in the nonvolatile memory 3. More specifically, the read/write controller 22 causes data read from the nonvolatile memory 3 to be stored in the buffer memory 11. In addition, the read/write controller 22 causes data stored in buffer memory 11 to be stored in the nonvolatile memory 3.

Next, a functional configuration of the controller 5 will be described. FIG. 3 is a block diagram illustrating a concrete example of the functional configuration of the controller 5 according to the embodiment.

The controller 5 includes a firmware receiving function 12, a registration function 13, a setting function 14, an address translation function 15, an error correction function 16, a wear leveling function 17, a garbage collection function 18, and an IPL function 19. At least part of the firmware receiving function 12, the registration function 13, the setting function 14, the address translation function 15, the error correction function 16, the wear leveling function 17, the garbage collection function 18, or the IPL function 19 may be implemented by a constituent element different from the controller 5. At least part of the firmware receiving function 12, the registration function 13, the setting function 14, the address translation function 15, the error correction function 16, the wear leveling function 17, the garbage collection function 18, or the IPL function 19 may be implemented by, for example, an electronic circuit. The processor 20 may implement at least part of the firmware receiving function 12, the registration function 13, the setting function 14, the address translation function 15, the error correction function 16, the wear leveling function 17, the garbage collection function 18, or the IPL function 19, by executing software.

When receiving a firmware image download command from the information processing device 2 via the interface unit 4 by the firmware receiving function 12, the controller 5 acquires the firmware FW1 from the information processing device 2 via the interface unit 4. Then, the controller 5 causes the firmware FW1 to be stored in the buffer memory 11 by the firmware receiving function 12.

When receiving a first firmware commit command from the information processing device 2 via the interface unit 4 by the registration function 13, the controller 5 causes the firmware FW1 of the buffer memory 11 to be stored in the slot SL1 of the extended logical address area 8. The firmware FW1 is thereby registered as one candidate which can be loaded by the IPL function 19.

When receiving a second firmware commit command from the information processing device 2 via the interface unit 4 by the setting function 14, the controller 5 reads specific firmware FW1 stored in the slot SL1 of the extended logical address area 8. Then, the controller 5 causes the read specific firmware FW1 to be stored in the initial load area 6 by the setting function 14. The firmware FW1 is thereby set as a target loaded by the IPL function 19 at the startup of the memory system 1. In other words, the second firmware commit command is a command for specifying the firmware FW1 which is to be active.

The controller 5 translates the LBA into the PBA, based on the address translation data 9, by the address translation function 15.

The controller 5 executes error correction of data which is read from the logical address area 7 or the extended logical address area 6 of the nonvolatile memory 3 by the error correction function 16. The error correction function 16 may execute error correction by using the error correction device 21. When an error occurs in the firmware FW1 read from the initial load area 6 of the nonvolatile memory 3, the controller 5 reads the other firmware FW1 stored in a multiplex state in the initial load area 6 via the read/write controller 22, by the error correction function 16. The controller 5 can thereby acquire normal firmware FW1.

The controller 5 smooths the degree of wear of each block in the logical address area 7 and the extended logical address area 8 of the nonvolatile memory 3 by the wear leveling function 17.

The controller 5 releases an area which becomes unnecessary in the logical address area 7 and the extended logical address area 8 of the nonvolatile memory 3 by the garbage collection function 18.

The controller 5 enables the wear leveling and the garbage collection by managing relationship between the logical address and the physical address in the logical address area 7 and the extended logical address area 8 by the address translation data 9.

The controller 5 reads the firmware FW1 stored in the initial load area 6 and causes the memory 10 to store the firmware FW1, by the IPL function 19, at the startup of the controller 5. The controller 5 (for example, processor 20) executes IPL (initial program loader) at the startup of the controller 5 to implement the IPL function 19. The IPL is software. The IPL is stored in, for example, the controller 5 in a nonvolatile state. Alternatively, the IPL may be stored in the nonvolatile memory 3.

Figure 4:
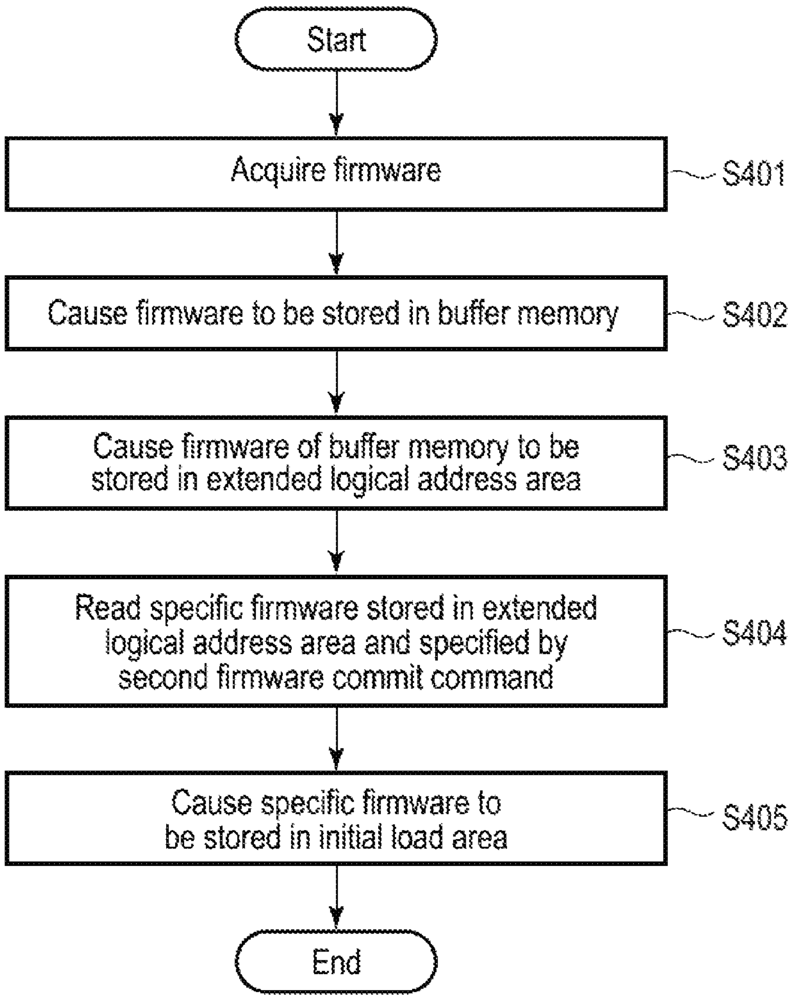
FIG. 4 is a flowchart illustrating an example of a setting process of firmware in the memory system according to the embodiment.

FIG. 4 is a flowchart illustrating an example of a setting process of the firmware FW1 in the memory system 1 according to the embodiment.

When receiving the firmware image download command from the information processing device 2 via the interface unit 4 (START), the controller 5 acquires the firmware FW1 from the information processing device 2 via the interface unit 4 (S401). The controller 5 causes the acquired firmware FW1 to be stored in the buffer memory 11 (S402).

When receiving the first firmware commit command from the information processing device 2 via the interface unit 4, the controller 5 causes the firmware FW1 stored in the buffer memory 11 to be stored in the slot SL1 of the extended logical address area 8 of the nonvolatile memory 3 (S403).

When receiving the second firmware commit command from the information processing device 2 via the interface unit 4, the controller 5 reads specific firmware FW1 specified by the second firmware commit command, of the firmware FW1 to FWn stored in the slots SL1 to SLn of the extended logical address area 8 (S404). The controller 5 causes the read specific firmware FW1 to be stored in the initial load area 6 of the nonvolatile memory 3 (S405). Then, the setting process is finished (END).

FIG. 5 is a flowchart illustrating an example of a process at the startup in the memory system 1 according to the embodiment.

When the memory system 1 starts up (START), the controller 5 reads the firmware FW1 of the initial load area 6 by the IPL function 19 (S501).

The controller 5 causes the read firmware FW1 to be stored in the memory 10 by the IPL function 19 (S502).

The controller 5 executes the firmware FW1 of the memory 10 (S503). Then, the process at the startup is finished (END).

In the memory system 1 according to the embodiment described above, for example, the plurality of firmware FW1 to FWn are stored in the respective slots SL1 to SLn of the extended logical address area 8 having the reliability of the same level as the logical address area 7 where user data is stored.

Since the reliability of the logical address area 7 and the reliability of the extended logical address area 8 are the same level, the plurality of firmware FW1 to FWn can be protected on the same level as the user data in the embodiment. More specifically, in the embodiment, error correction can be executed for the plurality of FW1 to FWn read from the extended logical address area 8, similarly to the user data read from the logical address area 7. Furthermore, the endurance of memory cells in the extended logical address area 8 can be improved by executing the wear leveling and the garbage collection for the extended logical address area 8, similarly to the logical address area 7. For this reason, the multiplexing number of firmware FW1 to FWn stored in the extended logical address area 8 can be reduced. For example, the firmware FW1 to FWn stored in the extended logical address area 8 may not be multiplexed. The size of the area required to store the firmware FW1 to FWn in the nonvolatile memory 3 can be reduced by thus reducing the multiplexing number of the firmware FW1 to FWn stored in the extended logical address area 8. In the embodiment, even if the number of the slots SL1 to SLn to be supported in the memory system 1 is increased, increase in the number of blocks considered necessary for the nonvolatile memory 3 can be suppressed.

In the embodiment, the initial load area 6 has lower reliability than the reliability of the logical address area 7 and the extended logical address area 8. However, the controller 5 can read normal firmware FW1 by multiplexing and storing the firmware FW1 in the initial load area 6.

In the embodiment, the only firmware FW1 loaded at the startup of the memory system 1 by the IPL function 19 is stored in the initial load area 6. The other firmware FW2 to FWn are not stored in the initial load area 6. The controller 5 loads the firmware FW1 from the initial load area 6 (equivalent to the active slot), which is a fixed block, by the IPL function 19. Changing the active firmware is implemented by rewriting the firmware stored in the initial load area 6 at executing the second firmware commit command. For this reason, the controller 5 does not need to select the active slot from the plurality of slots SL1 to SLn, at the startup, by the IPL function 19.

Therefore, in the embodiment, the IPL can be simplified.

The effectiveness of the memory system 1 according to the embodiment will be hereinafter described by comparing the memory system 1 according to the embodiment with a memory system of a comparative example.

Figure 6:
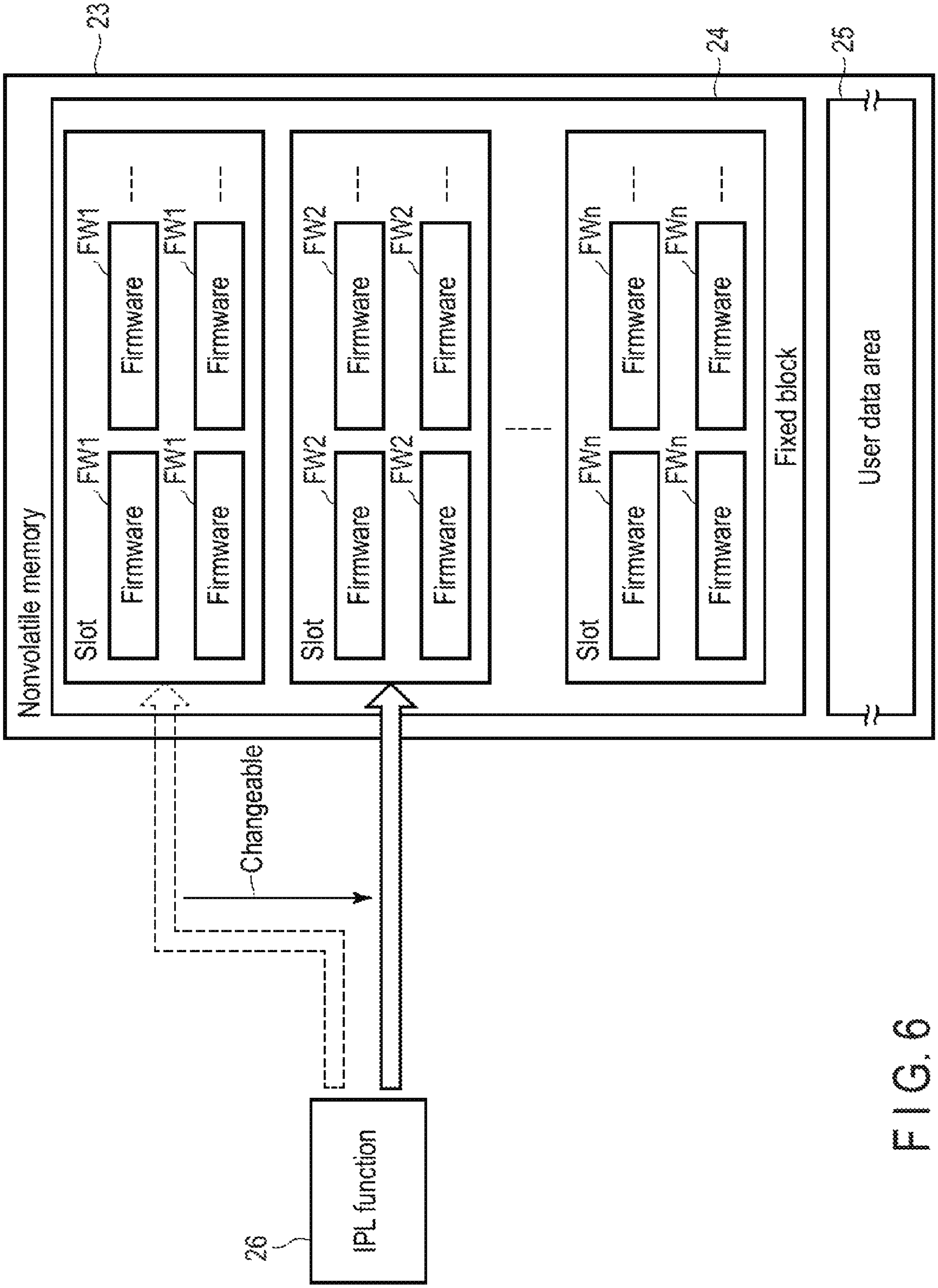
FIG. 6 is a block diagram illustrating an example of stored states of firmware in a memory system of a comparative example.

FIG. 6 is a block diagram illustrating an example of stored states of the firmware FW1 to FWn in the memory system of the comparative example.

For example, the memory system of the comparative example conforms to the NVMe standard. The memory system of the comparative example is, for example, SSD including a nonvolatile memory 23. The nonvolatile memory 23 of the memory system of the comparative example includes a fixed block 24 and a user data area 25. The plurality of slots SL1 to SLn are prepared in the fixed block 24 which can be referred to by an IPL function 26 of the controller, at the startup of the memory system of the comparative example. The plurality of firmware FW1 to FWn are stored in each of the plurality of slots SL1 to SLn. The firmware FW1 to FWn in the slots SL1 to SLn are multiplexed. More specifically, the plurality of firmware FW1 are stored in the slot SL1. The plurality of firmware FW2 are stored in the slot SL2. The plurality of firmware FWn axe stored in the slot SLn. A slot where active firmware loaded at the startup of the memory system of the comparative example is stored is selected as an active slot by the IPL function 26. The active slot can be changed by a firmware commit command. The controller selects the active slot by the IPL function 26 at the startup of the memory system of the comparative example. The controller causes firmware in the active slot to be stored in, for example, the memory such as DRAM by the IPL function 26.

The user data area 25 is an area which can be accessed based on the LBA. In the user data area 25, data do not need to be arranged at a fixed location. Wear leveling and the like can be applied to the user data area 25.

The slots SL1 to SLn in the memory system of the comparative example are prepared in the fixed block 24. In the memory system of the comparative example, wear leveling, error correction, garbage collection or the like cannot be applied to the areas of the slots SL1 to SLn. For this reason, the firmware FW1 to FWn are protected by multiplexing the firmware FW1 to FWn for each of the slots SL1 to SLn as described above, in the memory system of the comparative example. Alternatively, the firmware FW1 to FWn are protected by causing the firmware FW1 to FWn to be stored in the slots SL1 to SLn in single level cell (SLC) mode having higher reliability than multiple level cell (MLC) mode, triple level cell (TLC) mode, or quadruple level cell (QLC), in the memory system of the comparative example.

In the protection method of the memory system of the comparative example, the blocks for the slots SL1 to SLn are increased in accordance with increase in the support number of the slots SL1 to SLn. Then, in the memory system of the comparative example, the block number available as the user data area 25 may be reduced by increasing the blocks for the slots SL1 to SLn. In addition, the controller needs to enable the active slot to be selected by the IPL function 26.

In contrast, the memory system 1 according to the embodiment includes the plurality of slots SL1 to SLn including the plurality of firmware FW1 to FWn. In the embodiment, the plurality of slots SL1 to SLn are not provided in the fixed block 24, but the extended logical address area 8. In the embodiment, each of the plurality of firmware FW1 to FWn is stored in each of the slots SL1 to SLn of the extended logical address area 8. In the extended logical address area 8 and the logical address area 7 of the nonvolatile memory 3, Data do not need to be arranged at fixed locations. The initial load area 6 which can be accessed as the active slot by the IPL function 19, can store the firmware FW1 which is to be loaded at the startup of the memory system 1. The initial load area 6 does not store the firmware FW2 to FWn other than the firmware FW1 to be loaded at the startup of the memory system 1. The controller 5 can execute at least one of the wear leveling and the garbage collection for the extended logical address area 8 where the plurality of firmware FW1 to FWn are stored. The controller 5 can execute the error correction for the firmware FW1 to FWn read from the extended logical address area 8.

For this reason, in the memory system 1 according to the embodiment, multiplexing the firmware FW1 to FWn can be suppressed as compared with the memory system of the comparative example. In the memory system 1 according to the embodiment, storage of MLC, TLC, and QLC can be applied to the extended logical address area 8. For this reason, in the memory system 1 according to the embodiment, necessity to apply the storage of SLC can be reduced as compared with the memory system of the comparative example. Therefore, in the memory system 1 according to the embodiment, the area of the nonvolatile memory 3 necessary to store the plurality of firmware FW1 to FWn can be reduced.

In addition, in the memory system 1 according to the embodiment, when the second firmware commit command is received, the specific firmware in the slot selected from the plurality of slots SL1 to SLn of the extended logical address area 8 is stored in the initial load area 6 corresponding to the active slot. Thus, changing the active firmware is executed by storing the specific firmware of the selected slot in the initial load area 6. At the startup of the memory system 1, the controller 5 loads the specific firmware FW1 stored in the initial load area 6 on the controller 5 by the IPL function 19.

For this reason, the IPL function 19 of the embodiment does not need to select the active slot unlike the IPL function 26 of the memory system of the comparative example. Therefore, in the embodiment, the IPL can be simplified.

In the embodiment, the initial load area 6 does not have reliability so high as the reliability of the extended logical address area 8. However, the normal firmware FW1 can be loaded at the startup of the memory system 1 by storing the firmware FW1 in the multiplex state in the initial load area 6.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A memory system comprising:
a nonvolatile memory; and
a controller configured to control the nonvolatile memory, wherein
the nonvolatile memory includes:
a first area where specific software is capable of being stored, and
a second area where the specific software is capable of being stored, the second area having higher reliability than the first area, and
the controller is configured to:
cause a plurality of software as candidates which are capable of being loaded at, startup of the controller to be stored into the second area,
select the specific software from the plurality of software,
cause the selected specific software to be stored into the first area when receiving a command specifying the specific software, and
execute loading of the specific software stored in the first area at startup of the controller.

2. The memory system of claim 1, wherein
the controller is configured to translate a logical address into a physical address and access the second area based on the physical address.

3. The memory system of claim 1, wherein
the controller does not execute wear leveling for the first area but is capable of executing wear leveling for the second area.

4. The memory system of claim 1, wherein
the controller does not execute garbage collection for the first area but is capable of executing garbage collection for the second area.

5. The memory system of claim 1, wherein
the controller is configured to conform to non-volatile memory express (NVMe) standard,
each of the software is capable of being stored into each of slots in the second area, and
the specific software is capable of being stored as an active slot into the first area.

6. The memory system of claim 1, wherein a number of correctable error bits of the specific software read from the second area is larger than a number of correctable error bits of the specific software read from the first area.

7. The memory system of claim 6, wherein
the controller is configured to execute error correction for the specific software read from the second area.

8. The memory system of claim 1, wherein
the controller is configured to execute an initial program loader at startup of the controller, and
the initial program loader reads the specific software from the first area when the initial program loader is executed by the controller.

9. The memory system of claim 8, wherein
the first area is located at a predetermined location of the nonvolatile memory, and
the initial program loader reads the specific software from the predetermined location.

10. The memory system of claim 1, wherein
the controller is configured to receive the specific software when receiving a download command, and cause the specific software to be stored into the second area when receiving a commit command.

11. The memory system of claim 1, wherein
the controller is configured to cause the specific software to be stored into the first area in a multiplex state and, when an error occurs in the specific software read from the first area, read other specific software stored in the multiplex state in the first area.

12. The memory system of claim 11, wherein
a number of multiplexing of the specific software in the second area is smaller the number of multiplexing of the specific software in the first area.

13. The memory system of claim 1, wherein
the nonvolatile memory further includes a third area where user data are capable of being stored, and
the third area has higher reliability than the first area.

14. A method of controlling a memory system comprising a nonvolatile memory including a first area and a second area having higher reliability than the first area, the method comprising:
causing a plurality of software as candidates which are capable of being loaded at startup of the memory system to be stored into the second area;
selecting specific software from the plurality of software;
when a command specifying the specific software is received, causing the selected specific software to be stored into the first area, and
executing loading of the specific software stored in the first area at startup of the memory system.

15. The method of claim 14, further comprising:
translating a logical address into a physical address and accessing the second area based on the physical address.

16. The method of claim 14, further comprising:
executing wear leveling for the second area.

17. The method of claim 14, further comprising:
executing garbage collection fir the second area.

18. The method of claim 14, further comprising:
executing an initial program loader at startup of the memory system, and loading the specific software from the first area by the initial program loader.

19. A memory system comprising:
a nonvolatile memory; and
a controller configured to control the nonvolatile memory, wherein
the nonvolatile memory includes:

a first area where specific software is capable of being stored, and a second area where the specific software is capable of being stored, the second area having higher reliability than the first area, a number of correctable error bits of the specific software read from the second area being larger than a number of correctable error bits of the specific software read from the first area, and the controller is configured to:

cause the specific software to be stored into the first area when receiving a command specifying the specific software, and execute loading of the specific software stored in the first area at startup of the controller.

20. The memory system of claim 19, wherein the controller is configured to execute error correction for the specific software read from the second area.

* * * * *